(12) United States Patent
Diana et al.

(10) Patent No.: US 10,416,370 B2
(45) Date of Patent: Sep. 17, 2019

(54) ASYMMETRICAL LIGHT INTENSITY DISTRIBUTION FROM LUMINAIRE

(71) Applicant: Lumileds LLC, San Jose, CA (US)

(72) Inventors: Frederic S. Diana, Santa Clara, CA (US); Gregory Guth, San Jose, CA (US); Jeroen Den Breejen, San Jose, CA (US); Iain Black, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 163 days.

(21) Appl. No.: 15/437,872

(22) Filed: Feb. 21, 2017

(65) Prior Publication Data

US 2017/0242182 A1   Aug. 24, 2017

Related U.S. Application Data

(60) Provisional application No. 62/298,355, filed on Feb. 22, 2016, provisional application No. 62/328,402, filed on Apr. 27, 2016.

(30) Foreign Application Priority Data

Jun. 7, 2016 (EP) .................................. 16173295

(51) Int. Cl.
*F21V 8/00* (2006.01)
*F21S 8/08* (2006.01)
(Continued)

(52) U.S. Cl.
CPC .............. *G02B 6/0038* (2013.01); *F21K 9/61* (2016.08); *F21S 8/086* (2013.01); *G02B 6/0018* (2013.01);
(Continued)

(58) Field of Classification Search
CPC .. G02B 6/0038; G02B 6/0043; G02B 6/0046; G02B 6/0055; G02B 6/0058; G02B 6/0068; G02B 6/0073; F21S 8/086
(Continued)

(56) References Cited

U.S. PATENT DOCUMENTS 8,033,706 B1   10/2011   Kelly et al.
2009/0067178 A1   3/2009   Huang et al.
(Continued)

FOREIGN PATENT DOCUMENTS

DE   102013211311 A1   12/2014
EP        1574780 A1    9/2005
(Continued)

OTHER PUBLICATIONS

European Search Report dated Sep. 6, 2016 from European Patent Application No. 16173295.3, 10 pages.

*Primary Examiner* — Anh T Mai
*Assistant Examiner* — Michael Chiang
(74) *Attorney, Agent, or Firm* — Schwegman Lundberg & Woessner, P.A.

(57) ABSTRACT

In one embodiment, an overhead street light (a luminaire) is formed that has an asymmetric light intensity distribution, where the peak intensity is greatest along the direction of the street, lower directly across the street, and much lower on the house side of the street. Around the edge of a circular transparent light guide are white light LEDs that inject light into the light guide. To help control the asymmetry of the light intensity distribution, sawtooth-shaped grooves are formed in the light guide surface opposite to the light-emission surface and parallel to the street. Gaussian diffusers are used to partially diffuse the light. By proper selection of the grooves, the Gaussian diffuser, and the relative amounts of light emitted by LED segments around the light guide, the
(Continued)

desired asymmetrical light intensity distribution is achieved while a direct view of the light exit surface appears as a uniform light.

14 Claims, 5 Drawing Sheets

(51) Int. Cl.
    *F21K 9/61*           (2016.01)
    *F21Y 105/18*        (2016.01)
    *F21Y 115/10*        (2016.01)
    *F21W 131/103*      (2006.01)
    *F21Y 103/10*        (2016.01)
    *F21Y 103/33*        (2016.01)

(52) U.S. Cl.
    CPC ......... G02B 6/0036 (2013.01); G02B 6/0043 (2013.01); G02B 6/0046 (2013.01); G02B 6/0055 (2013.01); G02B 6/0058 (2013.01); G02B 6/0068 (2013.01); G02B 6/0073 (2013.01); *F21W 2131/103* (2013.01); *F21Y 2103/10* (2016.08); *F21Y 2103/33* (2016.08); *F21Y 2105/18* (2016.08); *F21Y 2115/10* (2016.08)

(58) Field of Classification Search
    USPC ........................................................ 362/606
    See application file for complete search history.

(56) References Cited

U.S. PATENT DOCUMENTS

| | | |
|---|---|---|
| 2010/0110673 A1 | 5/2010 | Bergman et al. |
| 2010/0118218 A1 | 5/2010 | Eichenlaub |
| 2010/0128489 A1 | 5/2010 | Holder et al. |
| 2010/0321952 A1 | 12/2010 | Coleman et al. |
| 2013/0308336 A1 | 11/2013 | Vissenberg et al. |
| 2015/0177439 A1 | 6/2015 | Durkee et al. |
| 2015/0331168 A1 | 11/2015 | Wang |
| 2016/0047969 A1 | 2/2016 | Lim et al. |

FOREIGN PATENT DOCUMENTS

| | | |
|---|---|---|
| WO | 2003046648 A1 | 6/2003 |
| WO | 2014208291 A1 | 12/2014 |

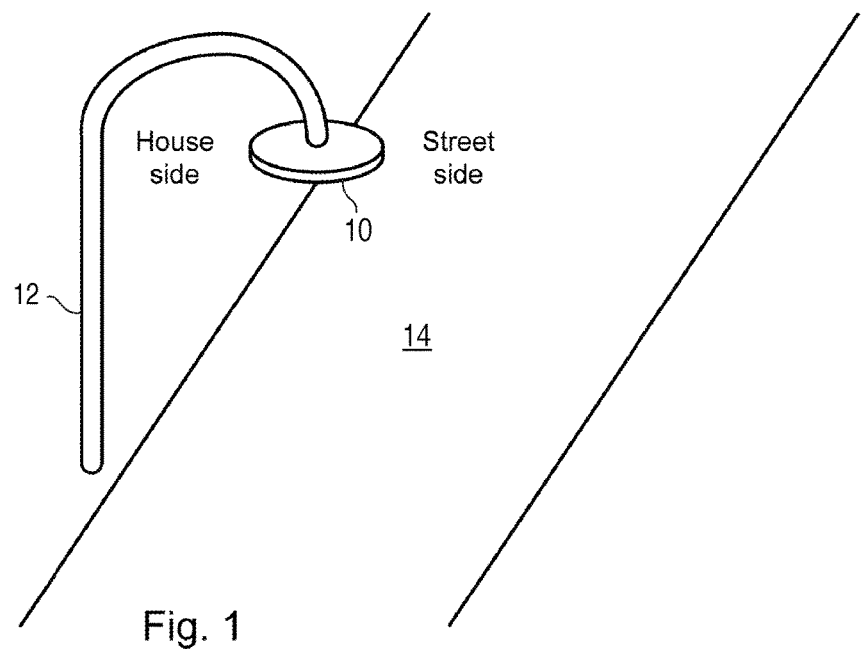
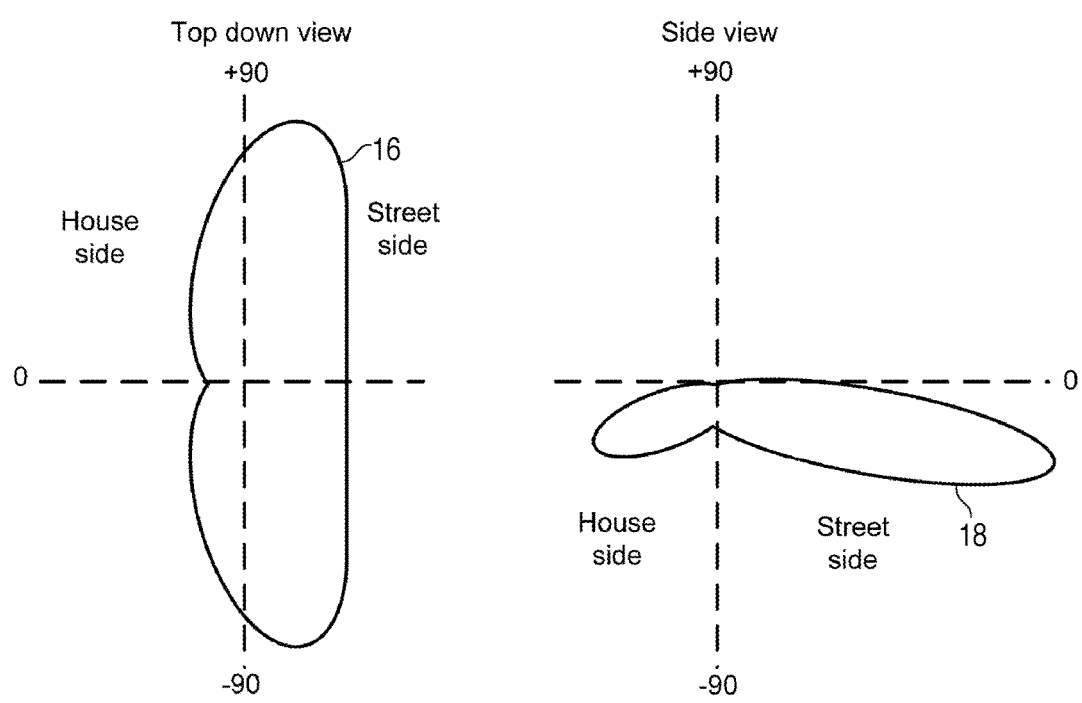
Fig. 1
Fig. 2
Fig. 3

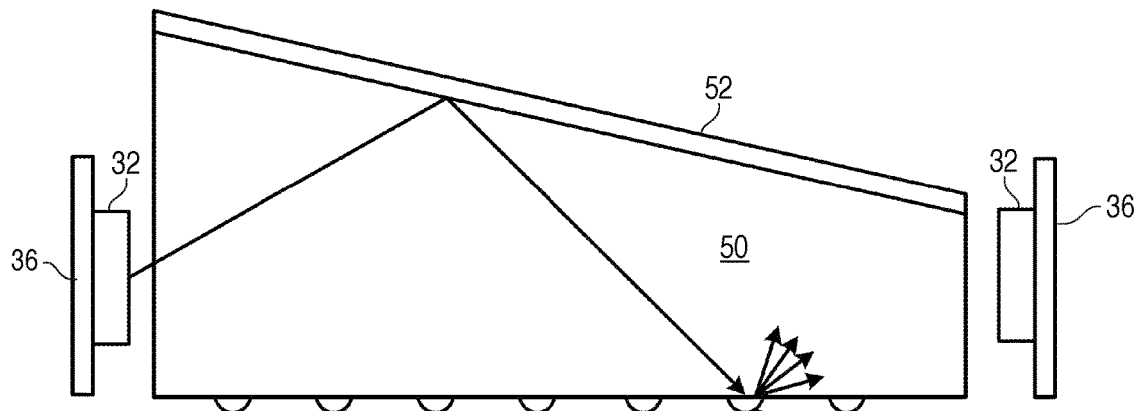
House side  Fig. 11  26  Street side
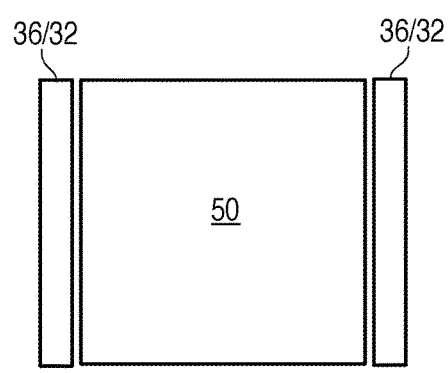
Fig. 12
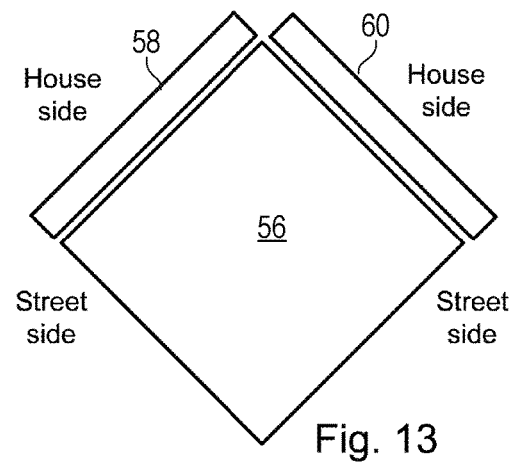
Fig. 13
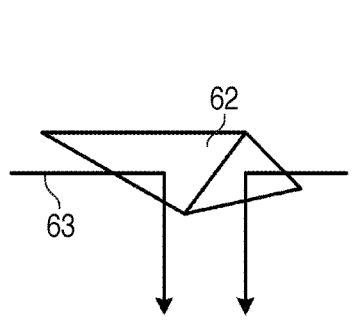
Fig. 14
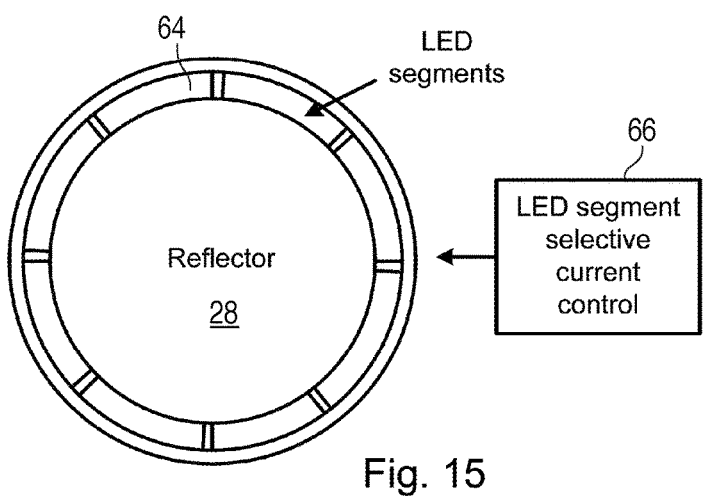
Fig. 15

ASYMMETRICAL LIGHT INTENSITY DISTRIBUTION FROM LUMINAIRE

CROSS-REFERENCE TO RELATED APPLICATIONS

The present application claims priority to U.S. Provisional Patent Application No. 62/298,355, filed Feb. 22, 2016, U.S. Provisional Patent Application No. 62/328,402, filed Apr. 27, 2016, and European Patent Application No. 16173295.3, filed Jun. 7, 2016. U.S. Provisional Patent Application No. 62/298,355, U.S. Provisional Patent Application No. 62/328,402, and European Patent Application No. 16173295.3 are incorporated herein.

FIELD OF THE INVENTION

This invention relates to general lighting using a light emitting diode (LED) lamp and, in particular, to a luminaire that generates an asymmetrical light intensity distribution suitable for illuminating a street, pathway, wall, or other area.

BACKGROUND

Conventional street lights are being replaced by more efficient and more reliable LED luminaires. The desired light intensity distribution provides the highest peak light intensity along the street with very little light intensity in the direction opposite to the street. The side of the luminaire facing away from the street is referred to herein as the "house side," and the side of the luminaire facing the street is referred to herein as the "street side." The light intensity in the house side direction should be just sufficient to illuminate a sidewalk or curb along the street.

Modern street lights using LEDs control the light intensity distribution using asymmetrical lenses over high power LEDs. Alternatively, conventional secondary optics are used to direct the light downward and sideways while blocking the light from being emitted in the house side direction. Such street lights have high glare when an observer looks directly at the luminaire. For example, one type of street light uses two parallel columns of eight high power white light LEDs with a separate lens over each LED. When viewed directly, 16 very bright point sources are seen. This is referred to as pixilated lighting and is aesthetically undesirable.

What is needed is an efficient luminaire using LEDs that has a controllable asymmetric light intensity distribution, such as optimized for overhead street lighting, where the luminaire has a non-pixilated pattern when viewed directly.

SUMMARY

In one embodiment, an overhead street light (a luminaire) is formed that has an asymmetric light intensity distribution, where the peak intensity is highest along the direction of the street, lower directly across the street, and much lower on the house side of the street. The intensity distribution may be a mirror image perpendicular to the street.

The luminaire comprises a circular transparent light guide, such as about 15 inches (38 cm) in diameter and about 0.5 cm thick. A circular metal frame supports the light guide. Around the edge of the light guide are white light LEDs on a flexible strip that inject light into the polished edge of the light guide to maintain directionality.

The LEDs on the strip are divided into segments, such as twelve segments (depending on the size of the luminaire). The segments may be designed or controlled to emit different amounts of light to aid in creating the desired asymmetrical light intensity distribution. The amount of light emitted by each segment may be controlled by varying the number of LEDs in each segment or varying the current to each segment. In another embodiment, the light emission from each segment is the same. Each segment may contain LEDs connected in series, and the segments may be connected in parallel.

In another embodiment, the LEDs are placed with variable pitch or density, and potentially with one or more rows of LEDs depending on the concentration needed, to achieve the desired azimuthal light intensity distribution (i.e., in the horizontal angular plane).

The light injected into the light guide internally reflects until the light is extracted, so the light is mixed somewhat within the light guide while still having some directionality.

To also control the asymmetry of the light intensity distribution, parallel sawtooth-shaped grooves are formed in the light guide surface opposite to the light-emission surface. The grooves are parallel to the street.

In one embodiment, all the grooves are identical and their angles and spacing can be designed to fine tune the light distribution and luminance uniformity over the emitting surface. The angled surfaces of the grooves generally face the house side LEDs, and the perpendicular surfaces of the grooves generally face the street side LEDs, so the light rays coming from both the house side LEDs and the street side LEDs are generally directed towards the street after reflection off the groove surfaces. The spacings between the grooves can be varied along the light guide to spread the light more uniformly across the light exit surface of the light guide.

In another embodiment, the angles and depths of the sawtooth-shaped grooves gradually increase toward the street side to reduce the amount of light that is reflected back toward the house side and further improve the luminance uniformity over the emitting surface.

On the light-emitting side of the light guide may be printed translucent dots, such as epoxy based dots, that can help increase light extraction efficiency and broaden the street side beam. The dots may be about 1 mm in diameter and have a Gaussian light emission (as opposed to Lambertian). The Gaussian dots diffuse the incident light ray somewhat along the direction of the incident light ray, such as providing a 12 degree half width, half maximum spread. The dots may be uniformly arrayed on the surface of the light guide and take up about half the area of the light emitting surface. Alternatively, the dots can have a variable size distribution or variable density distribution to improve the luminance uniformity over the entire emitting surface.

A Gaussian, continuous diffusive layer or surface texture (such as a more or less "frosted glass" finish) could also be used instead of dots.

These diffusing elements can also be placed on the backside surface of the light guide and alternate with the grooves. The light from the diffusing elements will be further mixed within the light guide to increase uniformity.

A reflector is positioned above the light guide to reflect backward any upward light that escaped the light guide.

An additional transparent optical plate inserted below the exit surface of the light guide can be used to protect the light guide and provide some additional light distribution control, such as to filter out high-angle light rays to reduce glare. Texture can be further added to the light guide surface to reduce or suppress the light directed toward the house side.

By proper selection of the grooves, the relative amounts of street side lighting and house side lighting can be controlled. By controlling the amount of light emitted by each LED segment, the asymmetric light intensity distribution can be further controlled. By using the Gaussian dots (or other suitable diffusers), the light exiting the light guide remains directional but sufficiently diffused so that an observer directly viewing the light emission surface of the light guide sees a generally uniform pleasant light.

In other embodiments, the light guide may be rectangular, rectangular with rounded corners, parallelepipedic (with possibly rounded corners), or elliptical. These light guides may also be formed as wedges, obviating the need for the sawtooth-shaped grooves. The Gaussian dots or other diffusers may be employed.

In another rectangular luminaire, the luminaire is angled with respect to the street, and the LED strips are only located along the two house side edges to cause most of the light to be directed along the street. Prisms molded into the back surface of the light guide further control the asymmetry of the light intensity distribution. The Gaussian dots or other diffusers may be employed.

The LEDs may be positioned inside holes formed near the perimeter of the light guide rather than the LED light being edge-injected into the sides of the light guide.

The luminaire may be used for any other purpose where an asymmetrical light intensity distribution is desired.

Other embodiments are disclosed.

BRIEF DESCRIPTION OF THE DRAWINGS

FIG. 1 is a perspective view of an embodiment of the invention (a luminaire) used as an overhead street light.

FIG. 2 is a light intensity distribution, from a test of the lamp of FIG. 1, in the horizontal cone intersecting the vertical angle for which the emitted luminous intensity (candela) is maximum, showing the highest intensity directed along the street, lower light intensity directed across the street, and the lowest light intensity directed toward the house side (opposite to the street side).

FIG. 3 is a light intensity distribution, from a test of the lamp of FIG. 1, in the vertical plane intersecting the horizontal angle for which the emitted luminous intensity (candela) is maximum, showing the highest light intensity being directed along the street at a slightly downward angle and a much lower light intensity directed toward the house side.

FIG. 11 is a cross-sectional view of a portion of a rectangular luminaire, where a wedge shape may be used instead of the grooves of FIGS. 8-10, and where Gaussian dots are also used.

FIG. 12 is a top down view of the luminaire of FIG. 11 showing how the LEDs may only need to be located along opposite edges of the wedge-shaped light guide.

FIG. 13 is a top down view of flat rectangular luminaire where the light guide is positioned at an angle with respect to the street, an array of varying-depth prisms are formed (e.g., molded) in the back surface to control the asymmetric light intensity distribution (lower intensity toward house side), and strips of LEDs are only positioned on the house side of the light guide to mainly inject light in the direction of the street.

FIG. 14 illustrates a single prism molded into the back surface of the light guide of FIG. 13 showing how light rays from the two LED segments are internally reflected toward the street and away from the house side. Other shapes of reflectors can be used.

FIG. 15 illustrates how the LED segments in a circular luminaire, such as shown in FIG. 1, can output different light power by controlling the currents to the segments to achieve a desired asymmetric light intensity distribution.

Elements that are the same or similar are labeled with the same numeral.

DETAILED DESCRIPTION

Figure 4:
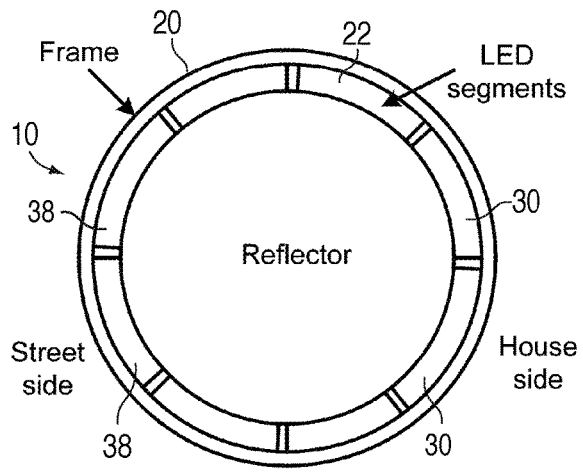
FIG. 4 is a top down view of the luminaire with the top cover removed, showing LED segments surrounding a circular light guide with a reflector sheet over the top.

Although the present invention can be used in a wide variety of applications, an example is shown that is optimized for use as a street light. FIG. 1 illustrates the luminaire 10 supported by a support structure 12 over a street 14. The asymmetrical light intensity distribution of the luminaire 10 is described with respect to the street side and the house side. The desired light intensity distribution is a high light intensity along a certain length of the street, a lower light intensity that extends across the street, and a much lower light intensity that is emitted in the opposite direction toward the house side. The light along the length of the street blends with light from the adjacent street light to provide a fairly uniform illumination of the entire street.

The example described below does not present a high-brightness pixilated light pattern when viewed directly by an observer. Rather, light is spread over the entire bottom surface of the light-emitting portion of the luminaire to create a substantially uniform diffused light that is much more pleasant than the pixilated light pattern.

FIG. 2 illustrates an example of a desirable light intensity distribution 16 (measured in candelas), obtained from a test of the lamp of FIG. 1, in the horizontal cone intersecting the vertical angle for which the emitted luminous intensity (candela) is maximum, where the luminaire 10 is at the intersection of the axes. Many other similar distributions are achievable and the optimal distribution may depend on the particular characteristics of the street to be illuminated. For example, for narrower streets, the street-side intensity distribution directed perpendicular to the street may be concave. In the example shown, the peak light intensity directed along (generally parallel to) the street is about 2-3 times higher than the peak light intensity directed directly perpendicular to the street, and the peak light intensity directed toward the house side is less than one-third of the light intensity directed directly perpendicular to the street. Such house side light may be used for illuminating pathways along the street or for the curb area if the luminaire is suspended well into the street.

FIG. 3 illustrates an example of a desirable light intensity distribution 18 (measured in candelas), obtained from a test of the lamp of FIG. 1, in the vertical plane intersecting the horizontal angle for which the emitted luminous intensity (candela) is maximum, where the luminaire 10 is at the intersection of the axes. In the example shown, the highest peak light intensity is directed along the street at a slightly downward angle and a much lower peak light intensity is directed toward the house side. The street side peak light intensity is well over three times the peak intensity directed toward the house side.

The light intensities are substantially mirror images relative to a center line perpendicular to the street.

Many other asymmetric light intensity distributions can be achieved using the structures described below.

FIG. 4 is a top down view of a portion of the luminaire 10 of FIG. 1 with the top cover removed. A circular metal frame 20 with a bottom opening has mounted around its inner periphery a flexible circuit tape containing a linear array of white light LEDs. The white light LEDs may be high power, GaN-based, blue-emitting LEDs with a YAG phosphor (produces yellow light) to create white light. Other phosphors may be added to obtain a desired color temperature or color rendition index (CRI).

In one embodiment, the frame 20 is about 15 inches in diameter, and there are about 168 LEDs. The LEDs are divided into segments 22, such as 12 segments, where the LEDs in a single segment 22 are connected in series, and the segments 22 are connected in parallel. If an LED has a forward voltage of 3.5 volts, the operating voltage of the luminaire 10 is about 42 volts.

Figure 5:
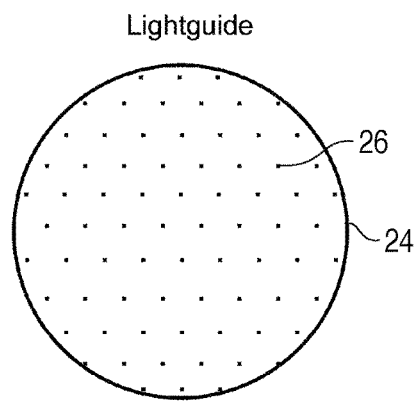
FIG. 5 is a bottom up view of the light guide showing Gaussian dots (about 1 mm diameter) printed on the light emission surface. In one embodiment, the dots take up about one half of the bottom surface of the light guide.

The circular light guide 24 of FIG. 5 seats in the frame 10 with the printed dots 26 facing downward toward the street. The light guide 24 may be a transparent polymer, such as PMMA, about 4-5 mm thick. The printed dots 26 will be more fully described later with respect to FIG. 8.

A reflector sheet 28 (FIG. 4) is positioned over the light guide 24 and LEDs to reflect all light downward (the reflector sheet 28 is shown smaller to not obscure the LEDs). In one embodiment, the reflector sheet 28 is specular, or a slightly diffusing mirror sheet, to substantially retain the directionality of the light rays to obtain better control over the asymmetry of the light intensity distribution. In another embodiment, the reflector sheet 28 may have a white surface to greatly increase the diffusion of light. The reflector sheet 28 may be spaced from the light guide 24 or directly on the light guide surface.

A metal cover (not shown) is affixed over the luminaire 10.

In one embodiment, to provide more control over the asymmetry of the light intensity distribution, the LED segments 22 are designed to emit different amounts of light.

Figure 6A:
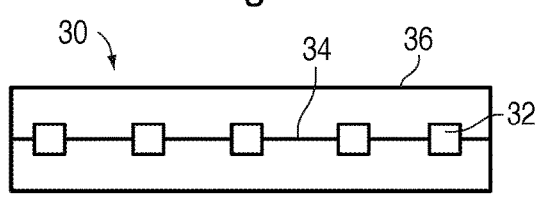
FIG. 6A is a front view of one segment of series-connected LEDs on a flexible printed-circuit strip or rigid printed-circuit board, where the segment contains 5 LEDs.

FIG. 6A illustrates an LED segment 30 that is designed to emit a high brightness for being located along the rear portion (house side) of the luminaire 10, such as in the locations shown in FIG. 4, so that the high brightness is directed along the street and away from the house side. Five LEDs 32 are shown connected in series by a conductor 34 on the flexible circuit 36. In an actual embodiment, there may be around 14 LEDs in a segment 22. The LEDs 32 have a generally Lambertian emission.

Figure 6B:
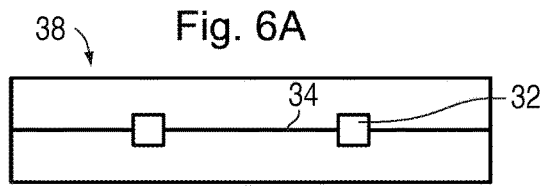
FIG. 6B is a front view of another segment of series-connected LEDs on a flexible printed-circuit strip or rigid printed-circuit board, where the segment contains only 2 LEDs for a reduced light output.

FIG. 6B illustrates another LED segment 38 that may also be used in the luminaire 10 which outputs a reduced brightness. In the example, only 2 LEDs 32 are in the segment 38. The segment 38 may be located at the locations shown in FIG. 4 to provide low brightness in the direction of the house side.

LED segments 22 in other locations around the light guide 24 may be designed to have different light outputs to further customize the light intensity distribution. Alternatively, different currents may be applied to identical LED segments 22 to customize the light output from the segments 22.

In one embodiment, each segment 22 around the light guide is identical and receives the same current, and the light intensity distribution of the lamp is customized using other techniques such as those described below.

Figure 7:
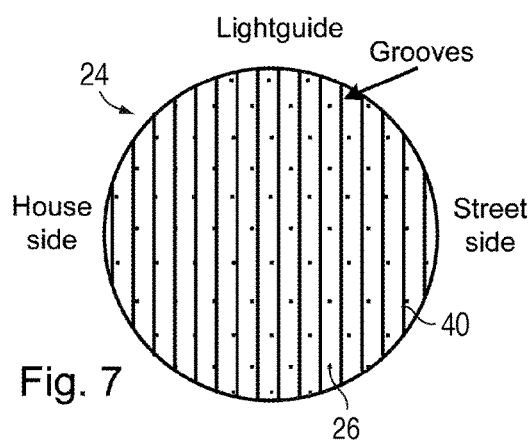
FIG. 7 illustrates an array of parallel sawtooth-shaped grooves formed on the back surface of the light guide, opposite to the surface containing the dots.

FIG. 7 illustrates the light guide 24 of FIG. 5 showing parallel grooves 40 molded or machined into the surface of the light guide 24 opposite the surface having the dots 26. The grooves 40 are sawtooth-shaped. The width of each groove 40 may be between 0.5-4 mm. The grooves 40 redirect impinging light downward toward the street side and reduce the amount of light internally reflected back from the edges of the light guide 24.

Figure 8:
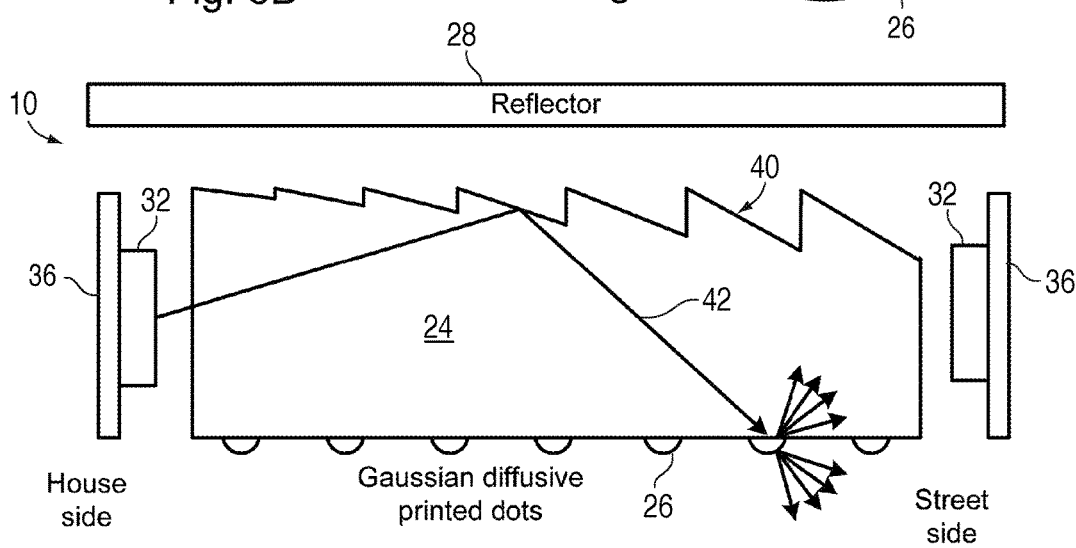
FIG. 8 is a cross-sectional view of a portion of the luminaire of FIG. 7 showing the LEDs emitting light into the edges of the light guide, the Gaussian dots (directional but diffusing) on the light emitting surface, the parallel sawtooth-shaped grooves in the back surface, and a reflector over the light guide.

FIG. 8 is a cross-sectional view of the luminaire 10 illustrating one embodiment of the grooves 40 and the printed dots 26. LEDs 32 mounted on the flexible circuit 36 are shown emitting white light into the light guide 24. The light generally reflects off the smooth inner surfaces of the light guide 24 by TIR until the light is reflected downward by an angled groove 24 or impinges on a translucent dot 26. The dots 26 may be epoxy-based and contain diffusing particles (e.g., $TiO_2$, high index micro-beads, etc.) that only slightly diffuse the light, such as by spreading the light a HWHM of about 12 degrees, centered around the direction of the impinging light ray 42. This retains some directionality of the impinging light but sufficiently diffuses the light so that the luminaire appears uniformly white to an observer. Some of the diffused light from the dot 26 is also reflected back into the light guide 24 to eventually escape.

The grooves 40 have a length that is parallel to the street, with the sloped surfaces of the grooves 40 angled downward for receiving most of the incident light from the house side LEDs (on left side). Note how the grooves 40 become deeper and deeper into the light guide 24 at increasing angles to progressively increase the chances that a light ray coming from the house side of the luminaire will be reflected downward by a groove 40. This greatly reduces the amount of light that will reflect off the right side edge of the light guide 24 back toward the house side to reduce the amount of light that is emitted toward the house side. Further, the varying depths/angles of the grooves 40 cause light from the house side LEDs to be more uniformly directed toward the light exit surface of the light guide 24, since the amount of light from the house side LEDs within the light guide 24 is progressively reduced by being emitted along the length of the light guide 24 while being increasingly intercepted by the varying depth/angle grooves 40. Accordingly, there is good uniformity of light at the light exit surface of the light guide 24, while still maintaining the asymmetrical light intensity distribution shown in FIGS. 2 and 3.

Conversely, the generally perpendicular surfaces of the angled grooves 40 cause much of the street side LED light to be reflected back toward the street side to increase the light emission from the street side. Since the street side LEDs are positioned around the front 180 degrees of the light guide 24, the light from the street side LEDs will be reflected away from the house side and emitted toward the street. In another embodiment, the grooves 40 all have the same angle and become deeper and deeper, and the widths of the grooves 40 progressively increase toward the street side.

Any light that escapes from the top of the light guide 24 is reflected back into the light guide 24 by the reflector sheet 28. As previously mentioned, the reflector sheet 28 can be specular (for the most directionality), diffuse specular, or white (for the least directionality).

In one embodiment, about 50 percent of the light entering the light guide 24 exits without being diffused by a dot 26, and the remaining 50 percent is diffused by a dot 26, since the dots 26 cover about half of the bottom surface of the light guide 24. The dots 26 may be other than hemispherical, such as rounded rectangular, rounded triangular, flat top circles, flat sided prisms, or other suitable shapes that create a diffused Gaussian emission.

By controlling the depths of the grooves 40 and their angles, the light intensity distributions of FIGS. 2 and 3 can be obtained. Additional control over the distributions can be obtained by controlling the relative light output power of the various LED segments 22 (FIG. 4).

Figure 9:
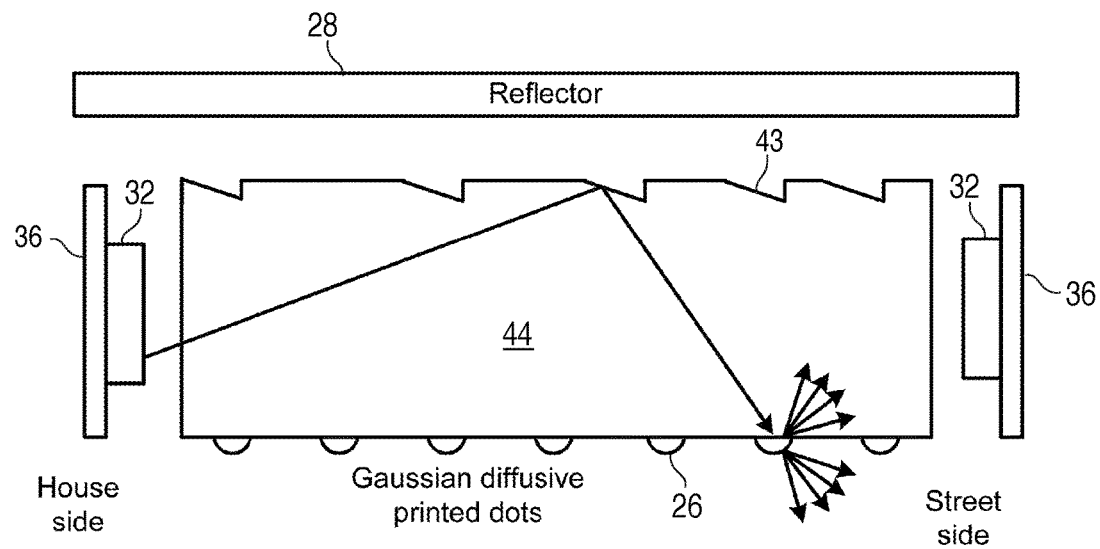
FIG. 9 illustrates the luminaire of FIG. 8 but where the grooves are identical and their spacing is varied.

FIG. 9 illustrates the luminaire of FIG. 8 but where the grooves 43 in the light guide 44 are identical and their spacing is varied. The grooves 43 become closer together as the grooves 43 approach the street side to reflect more light downward. Since the light from the house side LEDs is progressively reduced along the light guide 44, the increased density of grooves 43 causes the light along the light exit surface of the light guide 44 to be more uniform when directly viewed.

In another embodiment, the grooves 43 are evenly spaced while still achieving the asymmetrical light intensity distribution of FIGS. 2 and 3, since the light from the house side LEDs is generally directed downward by the angled surfaces of the grooves 43, while the light from the street side LEDs is generally reflected backward (and eventually downward) by the perpendicular surfaces of the grooves 43 facing the street side LEDs.

Figure 10:
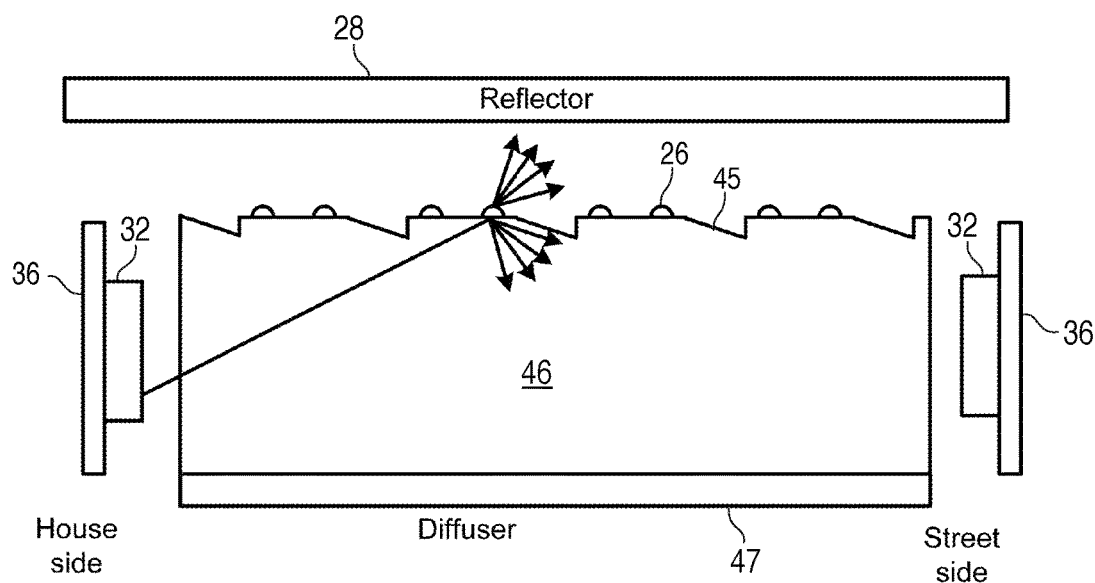
FIG. 10 illustrates the luminaire of FIG. 8 but where the grooves are identical and diffusing dots are printed between the grooves.

FIG. 10 illustrates the luminaire of FIG. 8 but where the grooves 45 in the light guide 46 are identical, and diffusing Gaussian dots 26 are printed between the grooves 45. The dots 26 redirect the incident light rays up and down in a diffusive/directional manner. The light redirected upwards is reflected back down by the reflector sheet 28. The light exit surface of the light guide 46 may have a diffusive layer 47, such as a laminated sheet or formed by machining or molding the light guide 46. The amount of diffusing should be limited in order to achieve the asymmetrical light intensity distribution of FIGS. 2 and 3.

Other diffusing elements may be formed on the grooved surface, such as roughening the surface or molding prisms into the surface.

Although circular luminaires have some advantages over rectangular luminaires, good asymmetrical light intensity distributions can still be achieved using rectangular luminaires. FIG. 11 is a cross-section of a rectangular light guide 50 having an angled top surface (a wedge shape) covered with a reflective sheet 52. FIG. 12 is a top down view of the luminaire of FIG. 11. The angled top surface causes a majority of the light emitted by house side LEDs (left side) to exit the light guide 50 away from the house side. The light may exit the light guide 50 directly or be slightly diffused by a dot 26. Much of the light emitted by the street side LEDs is reflected off the opposite flat wall of the light guide 50 and redirected out by the angled top surface and the dots 26.

FIG. 13 is a top down view of a flat (not-wedge-shaped) light guide 56 that is angled with respect to the street, such that its front sides are at 45 degree angles with respect to the street. The strips of LEDs 58 and 60 are positioned along the adjacent sides of the light guide 56 on the house side. Light from the LEDs is directed in the direction of the street. To redirect the light downwards and sideways into the street, an array of prisms 62, shown in FIG. 14, is molded into the back surface of the light guide 56 to redirect the light rays 63 toward the street. The position of the strips of LED 58/60 primarily controls the directionality toward the street and away from the house side. Some light is reflected back off the opposite edges of the light guide 56 and create a small house side emission. The angles of the prism walls can be controlled to create the asymmetrical light intensity distribution of FIGS. 2 and 3, or other desired distributions. The Gaussian dots may be printed on the light emitting surface of the light guide 56.

FIG. 15 illustrates the general luminaire of FIG. 4 but where the LED segments 64 have their brightness controlled by selecting different currents for the segments 64 using a current control circuit 66. The circuit 66 may be a passive circuit (e.g., resistors or a metal interconnect pattern) or a device that can be electronically controlled to achieve the desired light intensity distribution of the luminaire.

Figure 16:
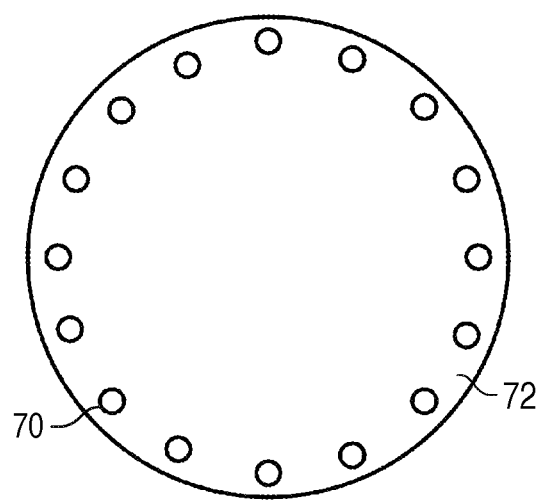
FIG. 16 is a bottom up view of a circular light guide having holes around its perimeter, such as 168 holes for a 15 inch luminaire, for receiving a ring of LEDs.
Figure 17:
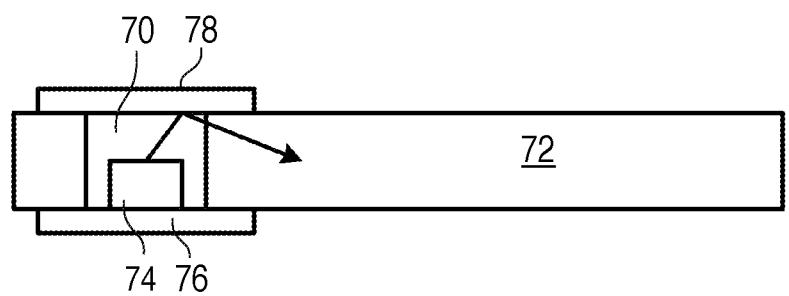
FIG. 17 is a cross-sectional view of the light guide of FIG. 16 further showing the LEDs within the holes and a reflector ring over the LEDs. The light guide includes the Gaussian dots and grooves or prisms previously described.

Instead of mounting LEDs around the edge of the light guide, either separated by an air gap or more directly optically coupled, the LEDs on the flexible circuit may be positioned inside holes formed around the perimeter of the light guide, such as shown in FIGS. 16 and 17. FIG. 16 shows through holes 70 formed around the periphery of a light guide 72. In one embodiment, the LEDs 74 (FIG. 17) may be arranged in segments similar to those shown in FIG. 4. The flexible circuit 76 supporting the LEDs 74 is formed in a ring. A reflective ring 78 is positioned over the top of the holes 70 and may also cover the light guide 72. The light guide 72 may include the grooves (FIGS. 8-10) and Gaussian dots 26 previously described to create the asymmetrical light intensity distribution of FIGS. 2 and 3.

The LEDs 74 in the holes 70 of FIG. 17 may be side-emitting, where a reflective layer is formed directly on the top surface of the LED dies over a phosphor layer.

Oval shaped luminaires are also envisioned.

Many other luminaire designs are contemplated using the techniques described herein to generate light having a distribution where much more light is emitted around one arc than another arc. For example, if the luminaires are used to illuminate a narrow walkway and are positioned only about one foot off the ground, they may be relative small (e.g., 4 inches in diameter), they may have a light intensity distribution that has very wide and narrow side lobes, a much shorter front lobe for a narrow walkway, and essentially no house side emission. Similar luminaires may be used for lighting a room for more uniformly accenting a wall, where the light is more evenly spread along the wall.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An illuminating device producing an asymmetrical light intensity distribution comprising:
   a circular light guide having a perimeter;
   a plurality of light emitting diodes (LEDs) mounted proximate to at least a portion of the perimeter of the light guide so as to inject light into the circular light guide, the plurality of LEDs being grouped into at least two groups of LEDs, a first group of the at least two groups of LEDs being located on one side of a diameter of the circular light guide, a second group of the at least two groups of LEDs being located on an opposite side of the diameter of the circular light guide, the first and second groups of LEDs being configured such that the first group of LEDs emits brighter light than the second group of LEDs;
   a diffuser on a light exit surface of the light guide, the diffuser producing a Gaussian emission which maintains a directionality of an impinging light ray while diffusing the light ray; and
   a plurality of linear grooves that form a second surface of the circular light guide opposite the light emitting surface, the plurality of linear grooves being parallel one another and spaced apart from one another along the diameter of the circular light guide, each of the plurality of linear grooves having an angled surface, for directing light toward the light exit surface of the light guide, and each of the plurality of linear grooves having a surface substantially perpendicular to the light exit surface of the light guide,
   wherein the first group of LEDs generate first incident light rays that are directed by the angled surfaces of the grooves toward the light exit surface to primarily contribute to the front emission and side emissions of the light guide,
   wherein the second group of LEDs generate second incident light that is reflected back towards the second LEDs by the surfaces of the grooves that are substantially perpendicular to the light exit surface to also primarily contribute to the front emission and side emissions of the light guide, and
   wherein the plurality of LEDs, the diffuser, and the linear grooves are configured to produce an asymmetrical light intensity distribution comprising the front emission, the back emission, and the side emissions, wherein the side emissions have a peak intensity that is at least twice that of the front emission, and the peak intensity of the back emission is less than that of the front emission.

2. The device of claim 1 wherein angled surfaces of the linear grooves become progressively deeper into the light guide as the linear grooves extend away from the first side of the diameters.

3. The device of claim 1 wherein the grooves have a width between 0.5-4 mm.

4. The device of claim 1 wherein the linear grooves have a varying spacing that gets smaller as the linear grooves extend away from the first side of the diameter.

5. The device of claim 1 wherein the diffuser comprises translucent dots formed on the light exit surface of the light guide, the translucent dots producing a Gaussian emission that maintains the directionality of an impinging light ray while diffusing the light ray.

6. The device of claim 5 wherein the translucent dots contain light scattering particles.

7. The device of claim 6 wherein the translucent dots cover less than two-thirds of the light exit surface of the light guide.

8. The device of claim 1 wherein the diffuser comprises a translucent surface on the light guide.

9. The device of claim 1 wherein the plurality of LEDs are arranged outside the perimeter of the light guide.

10. The device of claim 1 wherein the plurality of LEDs are arranged in holes around the perimeter of the light guide.

11. The device of claim 1 wherein LEDs within each respective group of the at least two groups of LEDs are connected in series, and wherein each of the at least two groups of LEDs are connected to one another in parallel.

12. The device of claim 1 wherein the first group of LEDs comprises more LEDs than the second group of LEDs.

13. The device of claim 1 wherein multiple groups of the first group of LEDs are disposed proximate to the perimeter of the circular light guide toward the first side of the diameter and multiple groups of the second group of LEDs are disposed proximate to the perimeter of the circular light guide toward the opposite side of the diameter.

14. The device of claim 1 wherein each group of LEDs is identical in structure but receives different currents to effect the different brightness levels.

* * * * *